United States Patent
Kijima et al.

(10) Patent No.: US 8,557,122 B2
(45) Date of Patent: Oct. 15, 2013

(54) BALLAST WATER TREATMENT EQUIPMENT, A BALLAST WATER DETOXIFYING TREATMENT SYSTEM USING THE SAME, AND A METHOD FOR TREATING THE BALLAST WATER

(75) Inventors: Akihiro Kijima, Sendai (JP); Yasuaki Kohama, Sendai (JP); Masae Suzuki, Sendai (JP); Ikuo Chiba, Ishinomaki (JP); Kouji Onodera, Ishinomaki (JP); Keiki Kano, Ishinomaki (JP); Kouichirou Kanno, Ishinomaki (JP); Takayuki Ito, Ishinomaki (JP); Yoshinobu Yashima, Sendai (JP); Toshihiko Abe, Sendai (JP)

(73) Assignees: Tohoku University, Miyagi (JP); Kowa Kogyo Co., Ltd., Miyagi (JP); Yamanishi Corporation, Miyagi (JP); Tsuda Kaiun Co., Ltd., Miyagi (JP); Japan Basic Material Co., Ltd., Miyagi (JP)

( * ) Notice: Subject to any disclaimer, the term of this patent is extended or adjusted under 35 U.S.C. 154(b) by 0 days.

(21) Appl. No.: 12/677,032

(22) PCT Filed: Mar. 5, 2010

(86) PCT No.: PCT/JP2010/001575
§ 371 (c)(1),
(2), (4) Date: Mar. 12, 2010

(87) PCT Pub. No.: WO2011/108032
PCT Pub. Date: Sep. 9, 2011

(65) Prior Publication Data
US 2012/0318751 A1  Dec. 20, 2012

(51) Int. Cl.
*C02F 1/76* (2006.01)
*B01F 15/00* (2006.01)

(52) U.S. Cl.
USPC ........ 210/694; 210/764; 210/242.1; 210/259; 210/512.1; 366/165.1; 366/176.1; 366/340

(58) Field of Classification Search
USPC ............... 210/756, 759, 760, 764, 205, 219, 210/242.1, 258, 259, 512.1, 694; 366/165.1, 165.2, 176.1, 340
See application file for complete search history.

(56) References Cited

U.S. PATENT DOCUMENTS

| | | | | |
|---|---|---|---|---|
| 5,674,312 A | * | 10/1997 | Mazzei | ......................... 210/750 |
| 5,951,923 A | | 9/1999 | Horie et al. | |
| 2003/0015481 A1 | * | 1/2003 | Eidem | ......................... 210/760 |

FOREIGN PATENT DOCUMENTS

| | | |
|---|---|---|
| JP | S63-19569 | 2/1988 |
| JP | 06-254567 | 9/1994 |
| JP | H10-008255 | 1/1998 |
| JP | H10-074746 | 3/1998 |
| JP | 2001-011634 | 1/2001 |
| JP | 2007-144391 | 6/2007 |
| JP | 2009-136864 | 6/2009 |

* cited by examiner

*Primary Examiner* — Lucas Stelling
(74) *Attorney, Agent, or Firm* — Lucas & Mercanti, LLP

(57) ABSTRACT

The present invention provides ballast water treatment equipment which can decompose fungicide included in ballast water and reduce the amount of use of fungicide adsorbing material by passing through the ballast water.

The ballast water treatment equipment for supplying ballast water to a ballast tank through a fungicide adding device, comprises:
  a shear flow generator put in an intake pipe from an intake opening to the ballast tank, and receiving ballast water from a high pressure pump; and
  a swirl flow generator connected to downstream of the swirl flow generator with a connecting pipe;
  wherein the shear flow generator has one or more venturi tubes with recesses arranged in parallel;

each the venturi tube with recess comprises an inlet side cross-sectional area reducing part gradually decreasing sectional area along a flow direction; an outlet side cross-sectional area enlarging part put in downstream of the inlet side cross-sectional area reducing part, and increasing cross-sectional area along the flow direction; a throat put between the inlet side cross-sectional area reducing part and the outlet side cross-sectional area enlarging part; and a shear flow generating recess opening to the throat;

wherein the swirl flow generator has a cylinder being aslant connected the connecting pipe of the shear flow generator to its outer lateral surface; and a diffuser pipe having an inner circumference surface increasing cross-sectional area along the flow direction and connected to the fungicide adding device through an intake pipe.

10 Claims, 6 Drawing Sheets

FIG. 6

|  | Residual chlorine mg/liter |
|---|---|
| Sea water including sodium hypochlorite | 1.0 |
| one step without outer air* | 0.8 |
| one step with outer air* | 0.6 |
| two steps without outer air * | 0.8 |
| Two steps with outer air* | 0.7 |

* -> structure of the swirl flow generator 37

BALLAST WATER TREATMENT EQUIPMENT, A BALLAST WATER DETOXIFYING TREATMENT SYSTEM USING THE SAME, AND A METHOD FOR TREATING THE BALLAST WATER

This is a U.S. National Phase Application under 35 U.S.C. 371 of International Application PCT/JP2010/001575, filed on Mar. 5, 2010, the entire content of which is hereby incorporated by reference.

BACKGROUND OF THE INVENTION

1. Field of the Invention

The present invention relates to detoxifying treatment for ballast water loaded to a ballast tank of a ship.

2. Description of the Related Art

These days, it comes under close scrutiny that vast amount of ballast water the water loaded into a ship and drained at each way port for keeping the ship steady) scattered all over the world destroys the gulf ecosystem of each way port, because of expansion of trades and global operation of large ships. Then global treaties of regulations and control for ballast water and deposition from ships have been adopted. It is required to observe ballast water treatment standards (quality e.g. not containing high levels of residual agents) according to a capacity of ballast water of each ship.

As one method for it, ballast water treatment equipment (Patent Document 1; Japanese Laid-Open Patent Publication No. 2007-144391: FIG. 2) is suggested. The equipment comprises: a filtering device for water intake to the ballast tank filtering seawater to trap and remove relatively-large sized aquatic creatures such as phytoplankton, animal plankton or the like; a fungicide adding device supplying fungicide (sodium hypochlorite) to the filtered seawater (direct adding of the fungicide or making fungicide by electrolysis of seawater); a first venturi tube put in downstream of the fungicide adding device, and damaging and eliminating the aquatic creatures by diffusing the fungicide to the filtered seawater with Venturi effect; a decomposition agent supplying device decomposing the fungicide in the ballast water for draining; a second venturi tube put in downstream of the decomposition agent supplying device, and diffusing decomposition agent (one venturi tube is used as both the first and the second venturi tubes.). And the Patent Document 1 (FIG. 3) teaches that increasing fungicidal capacity by supplying more fungicide into downstream of the last venturi tube.

There are several ways to add the fungicide by electrolysis of seawater (e.g. Patent Document 2; Japanese Laid-Open Patent Publication No. 1406-254567). In ballast water treatment, it is required to treat a large amount of ballast water rapidly without concentration difference of the fungicide. Therefore, it is not suitable to add only the fungicide generated by electrolysis of seawater and to dose the generated fungicide, because such the way of treatment may not damage or eliminate some of the aquatic creatures due to the concentration difference of the fungicide. The Patent Document 1 teaches a method of constant diffusion of the fungicide by using the venture tube.

After diffusing the fungicide, the ship voyages to next wayport while keeping a constant concentration (which can inhibit bleeding of bacteria) of the fungicide. The fungicide in the ballast water is decomposed with the decomposition agent, when the ballast water is drained at the next wayport. At that time, to decompose the fungicide completely, it is required to add excess decomposition agent. Accordingly, residual decomposition agent in the ballast water brings pollution to the seawater.

In addition, a high-efficient venturi tube having a recess for generating a shear flow opening to a throat to generate micro-nano bubbles is shown in Patent Document 3 (Japanese Laid-Open Patent Publication No. 2009-136864).

SUMMARY OF THE INVENTION

The present invention provides ballast water treatment equipment which decomposes most all of the fungicide included in the ballast water by being passed through with using minimum amount of the decomposition agent. Furthermore, the present invention provides a easy-to-use ballast water detoxifying treatment system using the ballast water treatment equipment.

In accordance with an aspect of the present invention, ballast water treatment equipment 3 for supplying ballast water 2 to a ballast tank 1 through a fungicide adding device 4, comprises:

a shear flow generator 31 put in an intake pipe 7 from an intake opening 6 to the ballast tank 1, and receiving ballast water 2 from a high pressure pump 9; and a swirl flow generator 37 connected to downstream of the swirl flow generator 37 with a connecting pipe 36;

wherein the shear flow generator 31 has one or more venturi tubes with recesses 33 arranged in parallel;

each the venturi tube with recess 33 comprises an inlet side cross-sectional area reducing part 33a gradually decreasing sectional area along a flow direction; an outlet side cross-sectional area enlarging part 33c put in downstream of the inlet side cross-sectional area reducing part 33a, and increasing cross-sectional area along the flow direction; a throat 33b put between the inlet side cross-sectional area reducing part 33a and the outlet side cross-sectional area enlarging part 33c; and a shear flow generating recess 33d opening to the throat 33b;

wherein the swirl flow generator 37 has a cylinder 37a being aslant connected the connecting pipe 36 of the shear flow generator 31 to its outer lateral surface; and a diffuser pipe 38 having an inner circumference surface increasing cross-sectional area along the flow direction and connected to the fungicide adding device 4 through an intake pipe 7.

The diffuser pipe 38 may be one step or multistep diffuser 38a-38c which has a tier-expanded inner surface expanding along the flow direction.

The swirl flow generator 37 may have an outer air supplier 39 on a center of an upper face 37c of the cylinder 37a.

In accordance with a second aspect of the present invention, a ballast water detoxifying treatment system A using the ballast water treatment equipment 3 comprises:

a ballast tank 1 storing ballast water 2;

an intake pipe 7 connecting a water intake opening 6 and the ballast tank 1;

a high pressure pump 9 put in the intake pipe 7;

the ballast water treatment equipment 3 according to claim 1 put in downstream of the high pressure pump 9;

a fungicide adding device 4 put in downstream of the ballast water treatment equipment 3, and adding fungicide to the ballast water 2 supplied from the ballast water treatment equipment 3;

a water pumping up pipe 17 connecting the ballast tank 1 to the intake pipe 7 upstream of the high pressure pump 9;

a drainage pipe 11 diverged from the intake pipe 7 at downstream of the ballast water treatment equipment 3;

a residual fungicide removing device 16 put in the drainage pipe 11;

a changeover valve R1 put in near a diverging point P1 between the intake pipe 7 and the water pumping up pipe 17, and changing over intake and drainage; and a changeover valve 22 put in near a diverging point P2 between the intake pipe 7 and the drainage pipe 11, and changing over intake and drainage.

In accordance with a third aspect of the present invention, a method for treating the ballast water using the ballast water detoxifying treatment system A, comprises:

in supplying ballast water 2 to a ballast tank 1,
 filtering the ballast water 2;
 passing through the filtered ballast water 2 to the ballast water treatment equipment 3 according to claim 1; and
 supplying the ballast water 2 to the ballast tank 1 after adding fungicide,
in draining the ballast water 2 from the ballast tank 1,
 pumping up the ballast water 2 from the ballast tank 1 to the ballast water treatment equipment 3;
 removing the residual fungicide in the ballast water 2 with activated carbon; and
 draining.

According to the present invention, a cascade field where generates a large number of nano bubbles, micrifies the nano bubbles, and blows out the residual nano bubbles and the micrified bubbles in chain-reaction can be generated. Passing ballast water 2 in which micro aquatic creatures (plants and animals) and fungi have been included through this cascade field causes destruction and injuring of the almost all micro aquatic creatures (or survived aquatic creatures). Accordingly, adding a small amount of the fungicide is enough for further destruction of the survived aquatic creatures.

In addition, because the survived aquatic creatures from the cascade field have suffered great damage, the aquatic creatures gradually become extinct with effect of the fungicide as time passes (up to 5 days). In the ballast tank 1, possible reactivation and multiplication of residual cyst (cell bodies and larvae in a dormant-like state wearing thick membrane temporarily) which can survive through the cascade field during long voyage is suppressed by the added fungicide.

When the ballast water 2 in the ballast tank 1 is drained off at overseas loading port, the ballast water 2 is de-fungicided again by the ballast water treatment equipment 3 and the fungicide removing device 16 before being drained, because the ballast water 2 in the ballast tank 1 still includes the fungicide. That results in the decomposition of the fungicide and the destruction of the small number of residual aquatic creatures and fungi survived in the ballast water 2.

BRIEF DESCRIPTION OF THE DRAWINGS

FIG. 6 is a table showing the result of decomposition and volatilization of the fungicide by the nano bubbles generation equipment for ballast water.

DETAILED DESCRIPTION OF THE INVENTION

Figure 1:
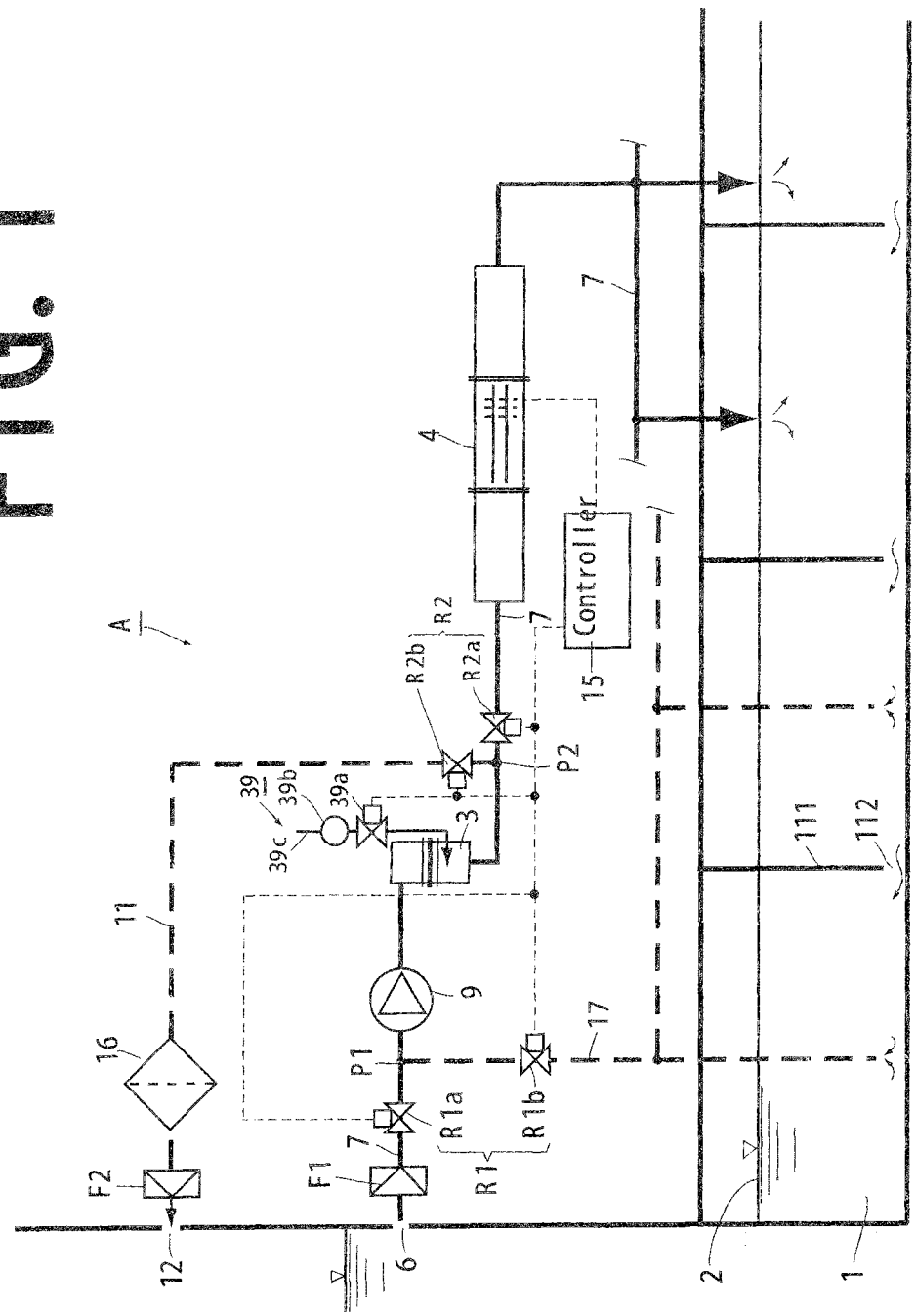
FIG. 1 is a piping system diagram of the present invention.

Hereinafter, preferred embodiments of a ballast water detoxifying treatment system A of the present invention will be concretely described. The system A can be applied to ballast water feed and drainage equipment of a ship, cooling equipment of a power plant, or the like. The case that the system A is applied to the ballast water feed and drainage equipment of a ship is described as follows. When the system is applied to the cooling equipment of a power plant, "a ship", "a ballast tank" and "ballast water" are substituted to "a power plant", "a cooling water tank", and "cooling water", respectively.

A ballast tank 1 is a tank for storing ballast water 2 and arranged from bow side to stern side of a ship. To keep balance of the ship, the inside of the ballast tank 1 is separated through the length and breadth by separate walls 111 and volume of the ballast water 2 storaged in the ballast tank 1 is controlled by ballast water distributor (not shown).

An inlet opening 6 and a drainage opening 12 are arranged at alongside of the ship. An intake pipe 7 connects the inlet opening 6 to the ballast tank 1. A filtering device for intake F1 is put in the inlet opening 6 of the intake pipe 7 or adjacent to. And a high pressure pump 9, a fungicide adding device 4, ballast water treatment equipment 3 are arranged in a row and in this order. A water pumping up pipe 17 is connected to a diverging point P1 on the intake pipe 7 between the filtering device for intake F1 and the high pressure pump 9. Accordingly, the ballast water 2 in the ballast tank 1 can be pumped up to the high pressure pump 9. A changeover valve R1 (comprises two valves R1a and R1b) is arranged on the diverging point P1. The ballast water treatment equipment 3 is put in downstream of the high pressure pump 9. The fungicide adding device 4 is put in downstream of the ballast water treatment equipment 3. The intake pipe 7 divaricated from the fungicide adding device 4 is connected to the ballast tank 1. And a drainage pipe 11 divaricated from a diverging point P2 between the ballast water treatment equipment 3 and the fungicide adding device 4 is connected to the drainage opening 12. A changeover valve R2 (comprises two valves R2a and R2b) is arranged on the diverging point P2. A filtering device for drainage F2 is arranged at the drainage opening 12 or arranged near the opening 12. And a fungicide removing device 16 is put in the drainage pipe 11 at upstream of the filtering device for drainage F2. Activated carbon or the like is suitable as filled material for the fungicide removing device 16, because the activated carbon can adsorb the residual fungicide passed through the decomposition treatment with the ballast water treatment equipment 3 before draining to sea.

The changeover valves R1, R2 are for changing over the direction of water flow. For the changeover valves R1-R3, three-way electromagnetic valves are used. In illustrated embodiment, as described above, two pairs of valves Ra1-R1b, R2a-R2b performing same operation as the changeover valves R1, R2 are arranged near the diverging pints P1, P2, respectively. The valve R1a is put between the filtering device F1 near the inlet opening 6 and the diverging point P1. The valve R1b is put in the water pumping up pipe 17. The valve R2a is put between the fungicide adding device 4 and the diverging point P2. And the valve R2b is put in the drainage pipe 11.

The filtering device for intake F1 comprises a coarse filtering part and a fine filtering part. Bulk material such as trash in the ballast water 2 taken from the inlet opening 6 at alongside of the ship and the aquatic creatures such as jelly fish, seaweed, or the like are removed in the coarse filtering part. And a part of phytoplankton and animal plankton in the ballast water 2 is filtered in the fine filtering part. In the similar manner, trash or the like in the ballast water 2 pumped from the ballast tank 1 is filtered in the filtering device for drainage F2.

Figure 2:
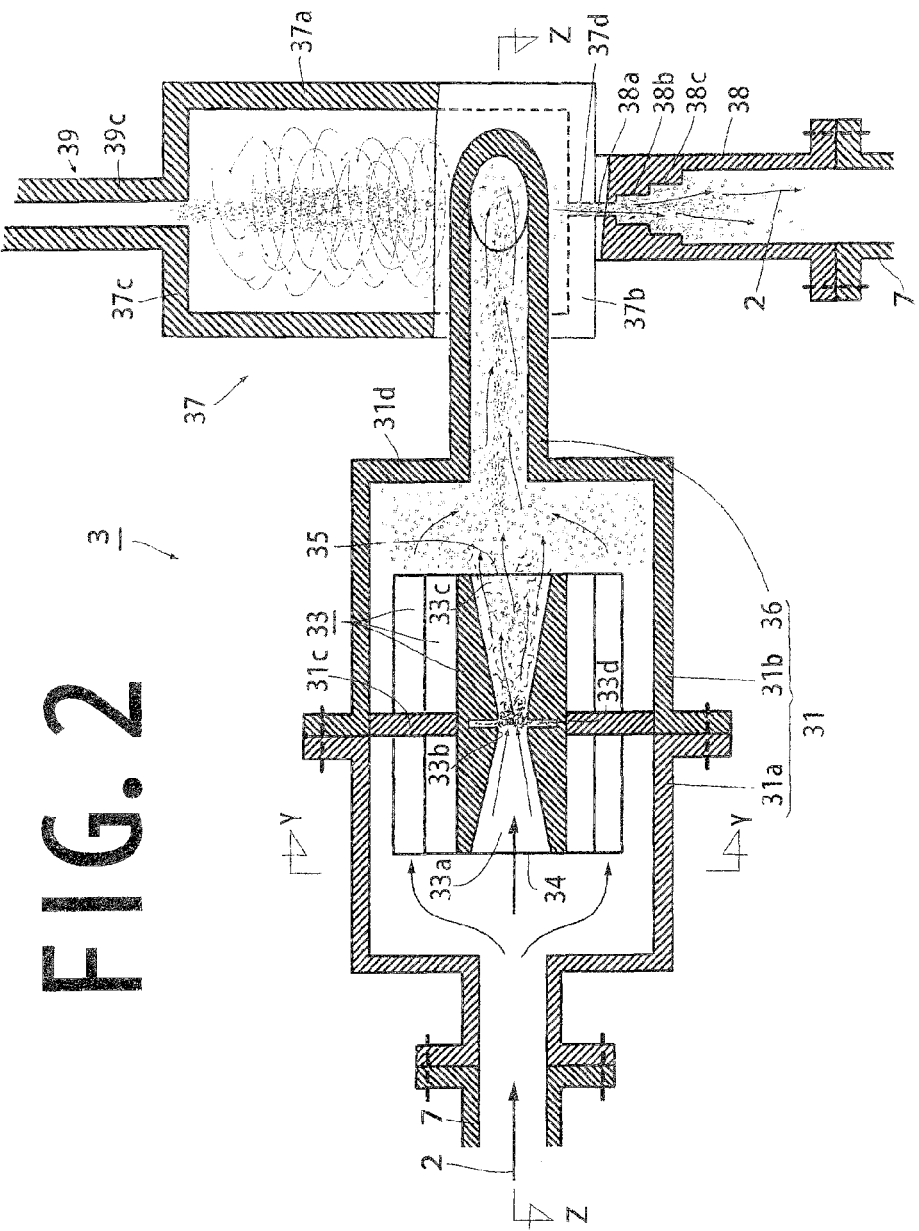
FIG. 2 is a cross-sectional view taken on line X-X of FIG. 4 showing the ballast water treatment equipment of the present invention in operation.
Figure 3:
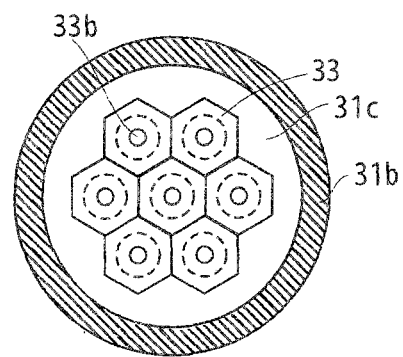
FIG. 3 is a cross-sectional view taken on line Y-Y of FIG. 2.
Figure 4:
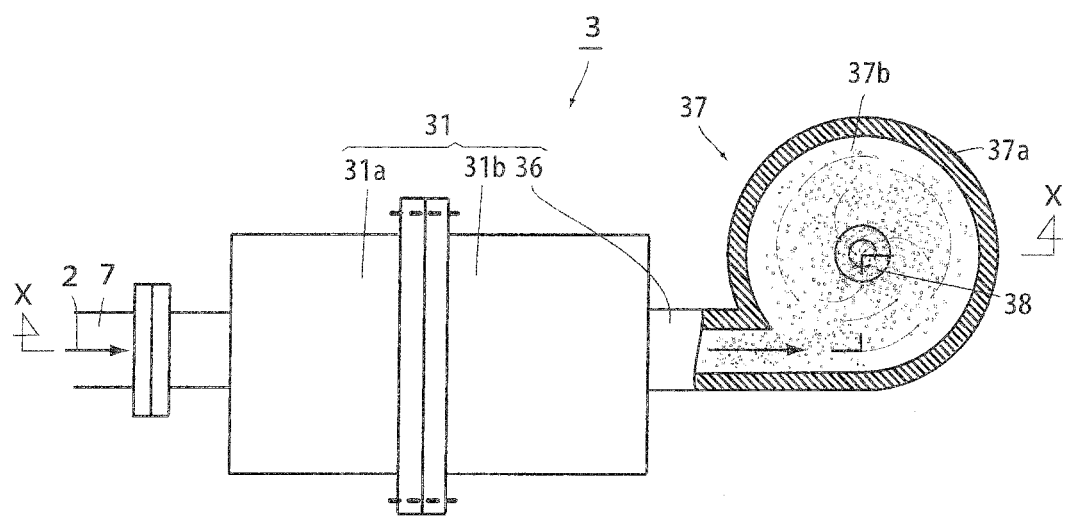
FIG. 4 is a fragmentary cross-sectional view taken on line Z-Z of FIG. 2.
Figure 5:
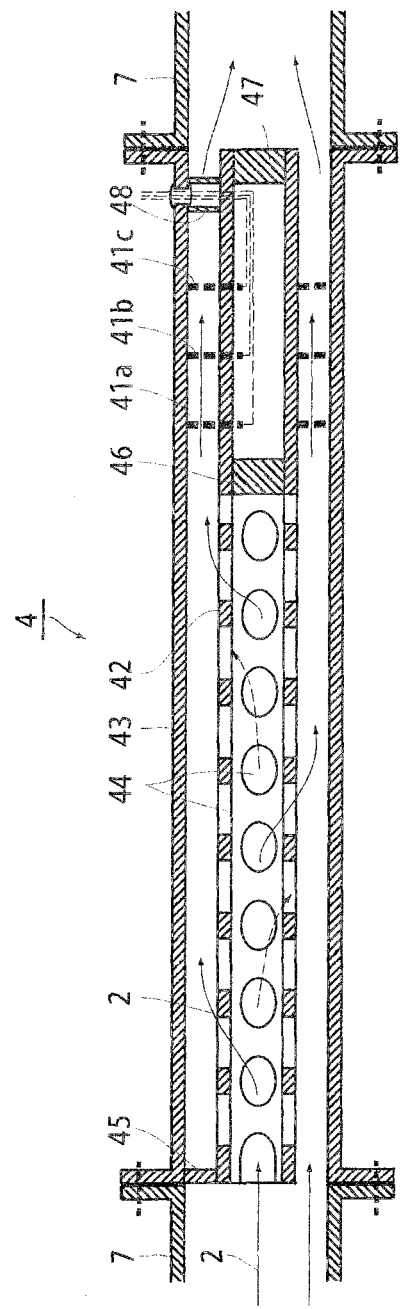
FIG. 5 is a schematic cross-sectional view of AC electrolysis apparatus used in the present invention.

The ballast water treatment equipment 3 which is put in downstream of the high pressure pump 9 comprises a shear flow generator 31 in entry-side and a swirl flow generator 37 having a cylindrical main body 37a and a diffuser pipe 38 connected to an outlet of the cylindrical main body 37a. One embodiment is illustrated in FIG. 2 to FIG. 4. The shear flow generator 31 comprises an anterior chamber 31a, a posterior chamber 31b having a plural of paralleled venturi tubes with recesses 33 internally, and a connecting pipe 36 connecting the posterior chamber 31b to the swirl flow generator 37. The anterior chamber 31a is connected to the intake pipe 7 from the high pressure pump 9. And the anterior chamber 31a is a cylinder with bottom face having expanded inner diameter for covering entry-openings 34 of the plural of paralleled venturi tubes with recesses 33. The intake pipe 7 is connected to the bottom face of the anterior chamber 31a. Open side of the anterior chamber 31a is coupled with the posterior chamber 31b with flange connection.

The posterior chamber 31b is also a cylinder with bottom face. The plural of paralleled venturi tubes with recesses 33 is inserted through a partition plate 31c oppilating an inlet opening of the posterior chamber 31b. One end of the connecting pipe 36 is connected to the bottom face (a downstream side face 31d), and the other end of the connecting pipe 36 is connected aslant to outer surface on outlet side of the cylindrical main body 37a. For example, the other end of the connecting pipe 36 is connected "tangentially" to the outer surface on outlet side of the cylindrical main body 37a.

Each of the venturi tubes with recesses 33 comprises a throat 33b being short and small cylinder, an inlet side cross-sectional area reducing part 33a having a polygonal shaped entry-opening 34, an outlet side cross-sectional area enlarging part 33c, and a shear flow generating recess 33d opening to the throat 33b. The cross-sectional shape of the inlet side cross-sectional area reducing part 33a is a streamline shape of which diameter is gradually reduced from the entry-opening 34 to the throat 33b and cross-sectional shape is transformed from the polygon to circularity. In addition, the reason that the entry-opening 34 is polygonal shape is to arrange each of the entry-openings 34 adjacently not to create a flat part which is in a direction perpendicular to the flow and generates flow resistance. Triangle, square, pentagon, and hexagon can be selected as the polygonal shape. In this embodiment, the pentagon shaped entry-openings 34 are arranged to make honeycomb in shape. The shape of the entry-opening 34 may be circularity. However, the circularity shaped entry-openings 34 make the flat part which generates flow resistance. Accordingly, the flat part generates pressure loss in the anterior chamber 31a. The diameter of the outlet side cross-sectional area enlarging part 33c is enlarged from the throat 33b to outlet opening. The shear flow generating recess 33d is disc-shaped space opening on entire circumference of the throat 33b. By adjusting width and depth of the shear flow generating recess 33d, nano bubbles can be generated, when the all of ballast water 2 is passing through the throat 33b.

The swirl flow generator 37 comprises the cylindrical main body 37a, a diffuser pipe 38 connected to outlet opening of the cylindrical main body 37a, and an outer air supplier 39 provided as necessary. The outer air supplier 39 comprises a pipe 39 connected to center of an upper face 37c of the cylindrical main body 37a, an outer air valve 39a put in the pipe 39, and an outer air supplying pump 39b. If inside of the swirl flow generator 37 is in negative pressure during operation, naturally-aspirated outer air can be supplied through the pipe 39c without using the outer air supplying pump 39b. The pipe 39 is arranged along a central axis of the cylindrical main body 37a. And the outer air is supplied through the pipe 39c into the cylindrical main body 37a. In this embodiment, one pipe 39c is connected to an opening for air supply on the upper face 37c. A plural of the pipes 39c may be connected to a plural of the openings for air supply.

The diffuser pipe 38 is provided from center of bottom face 37b on outlet side of the cylindrical main body 37a. And inside of the diffuser pipe 38 is shaped as a smooth cone (not shown), one step (not shown), or multistep diffuser 38a-38c with circularity cross-section shape (as shown in FIG. 1 and FIG. 3) of which each diameter is gradually enlarged along the flow. And the diffuser pipe 38 is connected to the intake pipe 7.

In this embodiment, one ballast water treatment equipment 3 is provided. However, a plural of the ballast water treatment equipment 3 may be provided in parallel depending on the amount of the ballast water to be treated. Furthermore, a plural of the ballast water treatment equipment 3 may also be provided in series for multiple treatment. An appropriate number of the venturi tubes with recesses 33 is selected. If one venturi tube with recess 33 is used, the intake pipe 7 and the connecting pipe 36 are connected directly to the entry-opening 34 and the outlet opening 35 of the venturi tube with recess 33, respectively.

Here, dechlorination in drainage and damaging the aquatic creatures or the like in the ballast water treatment equipment 3 in water intake are explained as follows. The ballast water 2 is pumped up from the ballast tank 1 and pressed into the throat 33b through the inlet side sectional area reducing part 33a rapidly by the high pressure pump 9. Strong shear flow is generated in the shear flow generating recess 33d by rapid expansion of the pressed ballast water 2. As a result, a large number of nano bubbles are generated with concentration and open of energy using fluid resonance phenomenon in the shear flow generating recess 33d. The nano bubbles have strong surface tension and exist with nearly zero volume in the ballast water 2. A part of the large number of nano bubbles is expanded (rebound) rapidly with decrease of pressure in the outlet side cross-sectional area enlarging part 33c. And blowout after rapid shrink in size of the part of nano bubbles in the term of rapid rebound of the pressure generates microjets and impact waves. The residual nano bubbles flow into the swirl flow generator 37 through the posterior chamber 31b and the connecting pipe 36.

The ballast water 2 including the fungicide and a large number of residual nano bubbles flow aslant into the swirl flow generator 37 through the connecting pipe 36 at high velocity. And the ballast water 2 flows in a direction of the diffuser pipe 38 as the outlet of the swirl flow generator 37 as gyrating at high velocity. As a result, strong swirl flow is generated at this time. Consequently, with the centrifugal force of high velocity swirl, pressure at outer circumference of cylindrical main body 37a becomes higher than that at central part.

In addition, there are two cases for supplying the outer air. One case is that the outer air is suctioned through the outer air supplier 39 into the swirl flow generator 37. The other case is that the outer air is not suctioned into. In latter case, the pressure at central part of the cylindrical main body 37a decreases. On the other hand, the outer air suction causes little pressure drop and generation of a large number of MN bubbles (micro-nano bubbles made of air). Sufficiently-low pressure at the central part of the cylindrical main body 37a generates natural suction, and insufficiently-low pressure needs forced suction by the outer air supplying pump 39b.

In the forced suction, opening the outer air valve 39a of the outer air supplier 39 and pressing the outer air from the outer air supplying pump 39b in operation (or natural suction of the outer air) into the swirl flow generator 37 makes gas-liquid mixing water mixed the air and the ballast water 2 including the fungicide with a large number of bubbles at outlet of the pipe 39c. And the mixed water flows with the swirl flow from the connecting pipe 36 to outlet substantially along center axis of the outer air supplier 39 as swirling.

Difference in specific gravity between relatively-large size bubbles of the suction air and liquid of the ballast water 2 including the fungicide causes a certain level of gas-liquid separation by the centrifugal force affected to the liquid and the centripetal force affected to the bubbles. Then the large number of separated bubbles flows in the direction of outlet as changing its diameter and taking on a cord in shape. In the meanwhile, a part of bubbles is sheared and teared apart by the swirl flow of high velocity swirling liquid. Consequently, fine bubbles, including nano bubbles, are generated in large numbers and are diffused rapidly in the cylindrical main body 37a.

In the case that the outer air is not suctioned, a large number of residual nano bubbles from the venturi tube with recess 33 are enlarged (rebound) to micro-nano bubbles at low pressure part in the swirl flow.

Furthermore, after compressed at the outlet opening 37d, enlargement of nano bubbles to micro-nano bubbles, acceleration of generation of cavitation by blowout of the micro-nano bubbles, and generating strong turbulence are arised by decrease of water pressure with rapid re-expansion in the diffuser pipe 38. In case that the diffuser pipe 38 is one or multistep diffuser 38a-38c, decrease of water pressure by one or multiple rapid stepwise expansion when the ballast water 2 passes through the diffuser pipe 38 at inner circumference surface causes acceleration of generation of cavitation and generating strong turbulence at corners. Then the ballast water 2 flows into the intake pipe 7 (in downstream side). In this period, continuous blowout of a large number of the micro-nano bubbles generates impact pressure (a phenomenon that one side surface of the bubble sticks out to the other side surface like a lance with generation of high pressure at the blowout) which is stronger than that in the outlet side cross-sectional area enlarging part 33c and in the cylindrical main body 37a, shear stress, heat, and chemical action such as OH-radical i.e. radical oxygen with strong oxidation power. Then a part of ClO⁻ of sodium hypochlorite (NaClO) in the ballast water 2 is decomposed and detoxified. Aeration by outer air suctioning in the swirl flow generator 37 contributes removal of decomposition products (see FIG. 6). This point is the same as in water intake. After breaking and damaging outer shell of protozoa which have comparatively hard shell and animal plankton, the fungicide added subsequently eliminates the aquatic creatures and fungi easily.

As described above, in the ballast water treatment equipment 3, rapid enlargement of nano bubbles to larger than micro-nano bubbles and chain of bubble blowout generate the field (cascade) with chain of microjet and impact wave at the cascade field (to be described) from the venturi tube with recess 33 to the diffuser pipe 38.

The cascade field is defined as a rapid pressure fluctuation field where overwhelming cavitation with intervention of a large number of nano bubbles is occurred. In this embodiment, the cascade field is rapidly changed from positive pressure field where is affected the centrifugal force of the swirl flow in circumference area of the cylindrical main body 37a to negative pressure field where is decreased the water pressure from the central part of the swirl flow to the diffuser pipe 38. The cascade field is a field towards a negative field where is decreased the water pressure from the outlet side cross-sectional area enlarging part 33c to the posterior chamber 31b and the connecting pipe 36 after generating a large number of nano bubbles in the shear flow generating recess 33d.

In addition, the cavitation (otherwise known as ambient temperature boiling phenomenon) has a hard erosion behavior (cavitation erosion) which can erode metal faces and generates finally hundreds of meters per second in velocity of strong microjets and impact waves by asymmetrically shrink with strong interference in the course of deterioration at pressure decreasing field. The impact waves eliminate the aquatic creatures and fungi living around and reinforces the chain of blowout of the other bubbles. Furthermore, the impact waves detoxify the (ClO⁻) electrochemically and physicochemically (see FIG. 6).

The fungicide adding device 4 put in downstream of the ballast water treatment equipment 3 is to add sufficient quantity of fungicide for eliminating the aquatic creatures or the like barely managed to survive after passing through the cascade field of the ballast water treatment equipment 3 for up to 5 days (IMO standard). The fungicide adding device 4 adds appropriate quantities of sodium hypochlorite to the ballast water 2, or produces sodium hypochlorite by electrolysis of the ballast water 2. In this embodiment, sodium hypochlorite is used as an example of the fungicide and AC electrolysis apparatus is used as an example of the fungicide adding device 4. Three electrodes (one of them is for ground electrode, the remains are for anode electrode and cathode electrode, respectively [Triode AC type]. Or else, no ground electrode and a pair of anode and cathode electrodes [bipolar electrodes AC type].) is treated as one pair. And one or several pairs of the three electrodes are used for the AC electrolysis apparatus 4. In this embodiment, the triode AC type is explained as an example.

The AC electrolysis apparatus 4 is an inline type in this embodiment and has a double structure comprising an inner pipe 42 and a outer pipe 43. And electrodes 41a-41c are fixed between the inner pipe 42 and the outer pipe 43 to pass all amount of the ballast water 2 around the electrodes 41a-41c. The electrodes 41a-41c are perforated-plates (e.g. expanded metals, perforated metal) made of titanium or stainless steel and plated with platinum. The electrodes 41a-41c are arranged at regular intervals (equal intervals) at outlet end of the inner pipe 42. Furthermore, outer surfaces of these electrodes 41a-41c have contact with an inner surface of the outer pipe 43. Accordingly, the ballast water 2 passing between the outer pipe 43 and the inner pipe 42 totally passes through a reticulation constructed by the electrodes 41a-41c. The outer pipe 43 is connected to the intake pipe 7.

From entry opening to central part, the inner pipe 42 has many through holes 44 through which water passes. Support 45 is arranged three-way radially near the entry opening between the inner pipe 42 and the outer pipe 43 for suspending the inner pipe 42 at center of the outer pipe 43. In inside of the inner pipe 42, closing plates 46, 47 are put in the end of the inner pipe 42, and between the end of the inner pipe 42 and the through hole 44 nearest the end, respectively. Electric wires connecting the electrodes 41a-41c to controller 15 is guided out through a support pipe 48 which is put in near the end of the outer pipe 43 between the inner pipe 42 and the outer pipe 43 and suspends the inner pipe 42 at center of the outer pipe 43.

In this embodiment, one AC electrolysis apparatus 4 is used. However, several AC electrolysis apparatuses 4 in parallel or in series may be used as appropriate. In addition, the inner pipe 42 is provided to support the electrodes 41a-41c in this embodiment. But the inner pipe 42 may not be necessary, when the electrodes 41a-41c can be fixed on inner surface of the outer pipe 43.

The embodiment explained as above is operated as follows. At unloading port, the ballast water 2 is taken into the ballast tank 1 against too much uplift of unloaded ship. In water intake, the valve R1b, R2b are closed, and the valve R1a, R2a are opened. Then the seawater is taken from the intake opening 6 by the high pressure pump 9. At this time, bulk material and bulk aquatic creatures (phytoplankton, animal plankton or the like) are removed from the ballast water 2 by the filtering device for intake F1. And these filtered objects are returned to the sea of the unloading port by reverse washing.

After passing through the filtering device for intake F1, the ballast water 2 is supplied totally to the nano bubbles generating equipment (ballast water treatment equipment) 3 by the high pressure pump 9 through the intake pipe 7. In the swirl flow generator 37 of the ballast water treatment equipment 3, the outer air is supplied as necessary to the ballast water 2 by opening the outer air valve 39a and operating the outer air supplying pump 39b, or natural suction. Then an infinite number of fine nano bubbles and micro-nano bubbles (enlarged nano bubbles) are generated in the ballast water treatment equipment 3 by the workings as described above. By blowing out the micro-nano bubbles rapidly, all or almost all the aquatic creatures or the like in the ballast water 2 are damaged (i.e. eliminated and injured). In addition, the effect of the cavitation may only be used by closing the outer air valve 39a in intake and drainage of the ballast water 2. All or almost all the aquatic creatures or the like in the ballast water 2 are eliminated and injured during the ballast water 2 passes through the cascade field in the ballast water treatment equipment 3. In the fungicide adding device 4 downstream of the ballast water treatment equipment 3, minimum amount of sodium hypochlorite (to be 3 mg/liter of chlorine) for eliminating the injured aquatic creatures or the like for up to 5 days in the ballast tank 1 is added in a state of mixed with the sea water 2. After that, the ballast water 2 is supplied to the ballast tank 1. In the ballast tank 1, the injured aquatic creatures or the like is eliminated by chlorine. And the concentration of chlorine is decreased to approximately 1 mg/liter, because the chlorine is consumed. The residual chlorine inhibits re-activation and reproduce of residual aquatic creatures or the like.

In loading at the next wayport, the ballast water 2 corresponding to weight of load is drained. In drainage, the ballast water 2 in the ballast tank 1 is pumped up by the high pressure pump 9 after closing the valve R1a,R2a and opening the valve R1b, R2b. The residual chlorine in the pumped ballast water 2 is decomposed by passing through the ballast water treatment equipment 3 and is adsorbed by the activated carbon in the residual fungicide removing device 16. After filtered by the filtering device for drainage F2, the ballast water 2 is drained to the sea.

FIG. 6 shows test data indicating decomposition of residual chlorine with the nano bubble generating device of the present invention. The test simulates the decomposition of residual chlorine in drainage. The data shows that it was required more then 12 mg/liter of the chlorine concentration for eliminating the aquatic creatures or the like for up to 5 days by adding only sodium hypochlorite without using the nano bubble generating device. However, at least 3 mg/liter (at the time of adding) of the concentration was enough for eliminating for up to 5 days with using the nano bubble generating device. And the concentration of the residual free chlorine in the ballast tank 1 after five days was 1 mg/liter. The residual free chlorine was measured by a residual chlorine measuring instrument (manufactured by Technoecho co, Ltd.) "Residual free chlorine" is defined as chlorine gas ($Cl_2$), hypochlorous acid (HOCl), and hypochlorite ion ($OCl^-$) existing in the test water (sea water in the ballast tank 1).

The concentration of salt of sea water for the test was 3.64 mg/liter, temperature of the sea water was 4.3 temperature of test atmosphere was 7, moisture content of the atomosphere was 42 and concentration of residue chlorine was 1.0 mg/liter. The sea water was pumped up by the high pressure pump and passed through the nano bubble generating device 3 in a flow rate of 138 liter/min.

For the nano bubble generating device 3, one stage diffuser pipe and two stage diffuser pipe were provided. The test was conducted in case without supplying outer air from the outer air supplier 39 to the cylinder 37a (without outer air) and in case with supplying (with outer air). The number of the venturi tubes with recesses 33 for the nano bubble generating device 3 was fifteen.

According to result of the test shown in FIG. 6, the dechlorination was established in each case. Especially, in case that using one stage diffuser (with outer air) was the best, because the concentration of residual chlorine was 0.6 mg/liter (this meant that 0.4 mg/liter of sodium hypochlorite had been decomposed.). Therefore, using the nano bubble generating device 3 of the present invention makes drastic reduction of the activated carbon usage for adsorbing chlorine in drainage, and reduction of the sodium hypochlorite usage for damaging heavily the aquatic creatures or the like in water intake.

What is claimed is:

1. Ballast water treatment equipment for supplying ballast water to a ballast tank through a fungicide adding device, comprising:
    a shear flow generator put in an intake pipe from an intake opening to the ballast tank, and receiving ballast water from a high pressure pump; and
    a swirl flow generator connected to downstream of the shear flow generator with a connecting pipe;
    wherein the shear flow generator has one or more venturi tubes with recesses;
    each of said venturi tube with recess comprises an inlet side cross-sectional area reducing part gradually decreasing sectional area along a flow direction; an outlet side cross-sectional area enlarging part put in downstream of the inlet side cross-sectional area reducing part, and increasing cross-sectional area along the flow direction; a throat put between the inlet side cross-sectional area reducing part and the outlet side cross-sectional area enlarging part; and a shear flow generating recess opening to the throat;
    wherein the swirl flow generator has a cylinder that is connected to the connecting pipe of the shear flow generator; and a diffuser pipe having an inner circumference surface that is increasing in cross-sectional area along the flow direction and connected to the fungicide adding device.

2. The ballast water treatment equipment according to claim 1, wherein the inner circumference surface of said diffuser pipe is shamed as a one step or multistep diffuser having a tier-expanded inner surface expanding along the flow direction.

3. The ballast water treatment equipment according to claim 1, wherein the swirl flow generator has an outer air supplier on a center of an upper face of the cylinder.

4. A ballast water detoxifying treatment system, comprising:

a ballast tank storing ballast water;
an intake pipe connecting a water intake opening and the ballast tank;
a high pressure pump put in the intake pipe;
a ballast water treatment equipment put in downstream of the high pressure pump, said ballast water treatment equipment comprising a shear flow generator containing one or more venturi tubes, and a swirl flow generator;
a fungicide adding device put in downstream of the ballast water treatment equipment, and adding fungicide to the ballast water supplied from the ballast water treatment equipment;
a water pumping up pipe connecting the ballast tank to the intake pipe upstream of the high pressure pump;
a drainage pipe connected to the intake pipe downstream of the ballast water treatment equipment;
a residual fungicide removing device put in the drainage pipe;
a first changeover valve put in near a diverging point between the intake pipe and the water pumping up pipe; and
a second changeover valve out in near a diverging point between the intake pipe and the drainage pipe.

5. A method for treating ballast water, comprising:
filtering ballast water;
passing through the filtered ballast water to a ballast water treatment equipment comprising a shear flow generator containing one or more venturi tubes, and a swirl flow generator;
supplying the ballast water to a ballast tank after adding fungicide,
pumping up the ballast water from the ballast tank to the ballast water treatment equipment;
removing the residual fungicide in the ballast water with activated carbon; and
draining.

6. The ballast water treatment equipment of claim 1, wherein two or more venturi tubes are arranged in parallel in the shear flow generator.

7. A ballast water detoxifying treatment system comprising:
a ballast tank storing ballast water;
an intake pipe connecting a water intake opening and the ballast tank;
a high pressure pump put in the intake pipe;
a shear flow generator put in downstream of the high pressure pump, the shear flow generator containing one or more venturi tubes with recesses,
wherein each of said venturi tube comprises
an inlet side cross-sectional area reducing part gradually decreasing sectional area along a flow direction,
an outlet side cross-sectional area enlarging part put in downstream of the inlet side cross-sectional area reducing part, and increasing cross-sectional area along the flow direction,
a throat put between the inlet side cross-sectional area reducing part and the outlet side cross-sectional area enlarging part,
a shear flow generating recess opening to the throat;
a swirl flow generator connected downstream of the shear flow generator,
wherein the swirl flow generator comprises a cylinder and a diffuser pipe having an inner circumference surface that is increasing in cross-sectional area along the flow direction;
a fungicide adding device put in downstream of the ballast water treatment equipment, and adding fungicide to the ballast water supplied from the ballast water treatment equipment;
a water pumping up pipe connecting the ballast tank to the intake pipe upstream of the high pressure pump;
a drainage pipe connected to the intake pipe downstream of the ballast water treatment equipment;
a residual fungicide removing device in the drainage pipe;
a first changeover valve out in near a diverging point between the intake pipe and the water pumping up pipe; and
a second changeover valve put in near a diverging point between the intake pipe and the drainage pipe.

8. The ballast water treatment system of claim 7, wherein two or more venturi tubes are arranged in parallel in the shear flow generator.

9. A method for treating ballast water, comprising:
filtering ballast water;
passing the filtered ballast water through a ballast water treatment equipment wherein the ballast water treatment equipment comprises:
a shear flow generator containing one or more venturi tubes with recesses,
each of said venturi tube comprises
an inlet side cross-sectional area reducing part gradually decreasing sectional area along a flow direction,
an outlet side cross sectional area enlarging part put in downstream of the inlet side cross-sectional area reducing part, and increasing cross-sectional area along the flow direction,
a throat put between the inlet side cross-sectional area reducing part and the outlet side cross-sectional area enlarging part, and
a shear flow generating recess opening to the throat; and
a swirl flow generator connected downstream of shear flow generator,
wherein the swirl flow generator comprises a cylinder and a diffuser pine having an inner circumference surface that is increasing in cross-sectional area along the flow direction;
supplying the ballast water to a ballast tank after adding fungicide,
pumping up the ballast water from the ballast tank to the ballast water treatment equipment;
removing the residual fungicide in the ballast water with activated carbon; and
draining.

10. The method for treating ballast water of claim 9, wherein two or more venturi tubes are arranged in parallel in the shear flow generator.

* * * * *